(12) United States Patent  
Price et al.

(10) Patent No.: US 8,182,871 B2
(45) Date of Patent: *May 22, 2012

(54) METHOD OF MAKING TOPOGRAPHICALLY PATTERNED COATINGS

(75) Inventors: Peter E. Price, Minneapolis, MN (US); William B. Kolb, West Lakeland, MN (US); Mikhail L. Pekurovsky, Bloomington, MN (US); Steven D. Solomonson, Shoreview, MN (US); Mitchell A. F. Johnson, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 628 days.

This patent is subject to a terminal disclaimer.

(21) Appl. No.: 11/815,777

(22) PCT Filed: Feb. 9, 2006

(86) PCT No.: PCT/US2006/004567
§ 371 (c)(1),
(2), (4) Date: Aug. 8, 2007

(87) PCT Pub. No.: WO2006/088721
PCT Pub. Date: Aug. 24, 2006

(65) Prior Publication Data
US 2008/0166494 A1    Jul. 10, 2008

Related U.S. Application Data

(60) Provisional application No. 60/653,358, filed on Feb. 16, 2005.

(51) Int. Cl.
*B05D 5/00*  (2006.01)

(52) U.S. Cl. .................. 427/256; 427/487; 430/311

(58) Field of Classification Search ............... 427/256, 427/487; 430/311
See application file for complete search history.

(56) References Cited

U.S. PATENT DOCUMENTS

| 3,544,790 | A | 12/1970 | Brown |
| 3,788,846 | A | 1/1974 | Mayaud et al. |
| 3,911,191 | A * | 10/1975 | Guastella et al. ............. 428/342 |
| 4,698,914 | A * | 10/1987 | Shu et al. ......................... 34/370 |
| 5,060,396 | A | 10/1991 | Hansen |
| 5,581,905 | A | 12/1996 | Huelsman et al. |
| 5,694,701 | A | 12/1997 | Huelsman et al. |
| 6,069,219 | A | 5/2000 | McCormick et al. |
| 6,078,713 | A * | 6/2000 | Tausch et al. ................. 385/115 |
| 6,242,504 | B1 * | 6/2001 | Meyer-Roscher et al. ....... 522/2 |
| 6,296,732 | B1 * | 10/2001 | Enlow et al. .................. 156/209 |
| 6,299,799 | B1 | 10/2001 | Craig et al. |
| 6,352,758 | B1 | 3/2002 | Huang et al. |
| 6,372,407 | B1 | 4/2002 | Liu et al. |

(Continued)

FOREIGN PATENT DOCUMENTS

DE       1 497 404       8/1969

(Continued)

*Primary Examiner* — Shamim Ahmed
(74) *Attorney, Agent, or Firm* — James A. Baker; Douglas B. Little

(57) ABSTRACT

Methods of forming patterned coatings are disclosed. The methods include the steps of disposing a composition onto a substrate to form a liquid coating on the substrate and removing or providing energy through a first pattern of areas on the liquid coating to form a topographically patterned coating, the topographical pattern corresponding to the first pattern of areas.

12 Claims, 7 Drawing Sheets

U.S. PATENT DOCUMENTS

| | | |
|---|---|---|
| 6,391,217 B2 * | 5/2002 | Schaffer et al. ............. 216/41 |
| 6,444,378 B1 | 9/2002 | Johnson |
| 6,660,363 B1 | 12/2003 | Barthlott |
| 6,957,608 B1 * | 10/2005 | Hubert et al. ............. 101/483 |
| 7,115,216 B2 * | 10/2006 | Carter et al. ............. 252/301.16 |
| 2001/0006766 A1 | 7/2001 | O'Brien et al. |
| 2003/0124360 A1 | 7/2003 | Reihs et al. |
| 2003/0194497 A1 * | 10/2003 | Takada et al. ............. 427/355 |
| 2003/0229163 A1 * | 12/2003 | Araki ............. 524/88 |
| 2004/0191671 A1 * | 9/2004 | Hsu ............. 430/270.1 |
| 2004/0197578 A1 * | 10/2004 | Sinsel et al. ............. 428/461 |

FOREIGN PATENT DOCUMENTS

| | | |
|---|---|---|
| GB | 2 237 657 | 5/1991 |
| WO | WO 94/20223 A1 | 9/1994 |
| WO | WO 96/04123 A1 | 2/1996 |
| WO | WO 01/16370 A1 | 3/2001 |
| WO | WO 01/92179 A1 | 12/2001 |
| WO | WO 03/013827 A1 | 2/2003 |
| WO | WO 03/099953 A1 | 12/2003 |

* cited by examiner

100 μm

100 μm

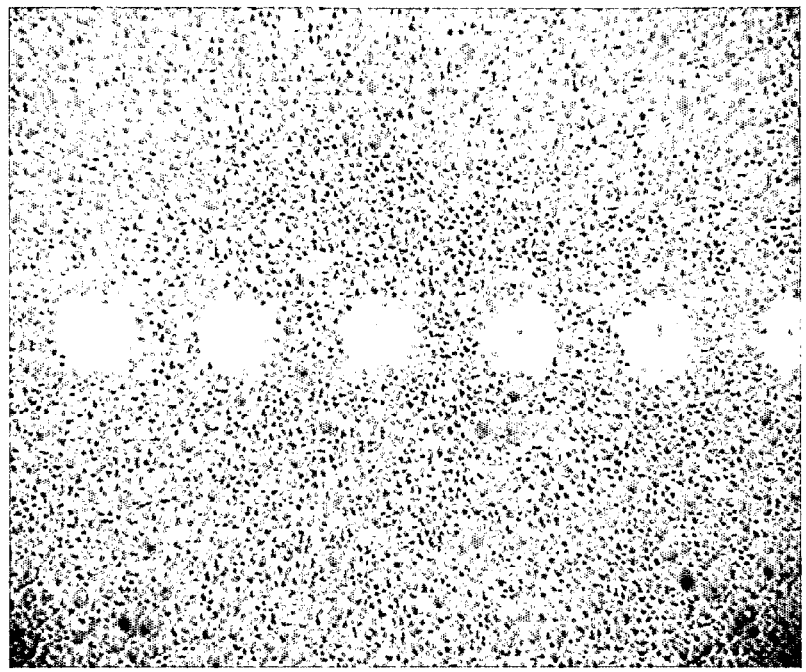
Fig. 9  100 μm
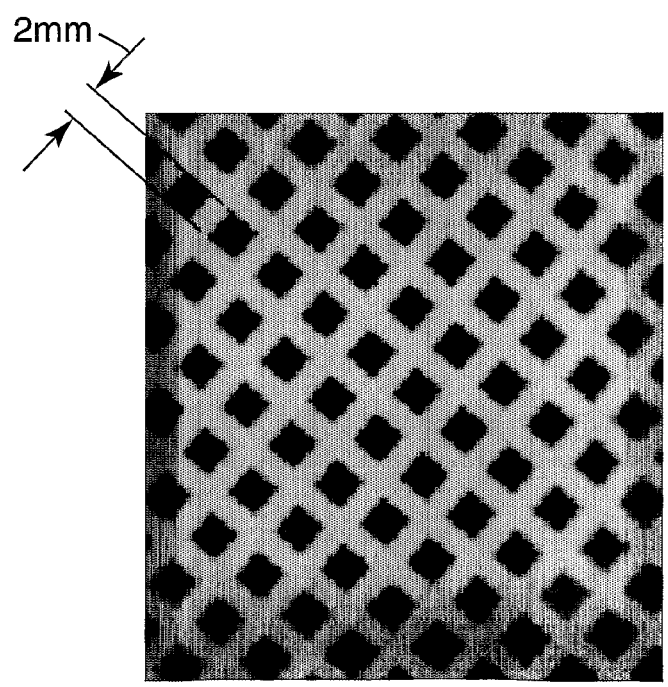
Fig. 10

METHOD OF MAKING TOPOGRAPHICALLY PATTERNED COATINGS

CROSS REFERENCE TO RELATED APPLICATIONS

This application is a national stage filing under 35 U.S.C. §371 of PCT/US2006/004567, filed Feb. 9, 2006, which claims priority to Provisional Application No. 60/653,358 filed Feb. 16, 2005.

BACKGROUND

The present invention generally relates to methods of making patterned coatings. The present invention more particularly relates to methods of making patterned coatings by providing a pattern of energy to or removing a pattern of energy from a liquid coating and solidifying the resulting patterned coating.

Many industrial and consumer products contain thin layers of material that are created by disposing a liquid film onto another material and then solidifying the liquid film. Examples include adhesive tapes, abrasive sheets, painted surfaces, magnetic media, component films in LCD displays, etc. It is often desirable to have topographical features or patterns in such layers to impart aesthetic or performance characteristics. Topographical patterns have been created in such layers using a limited number of technologies. These technologies can be divided into two classes, those that create patterns with or in solid material, for example by etching, and those that create patterns with or in liquid material that is subsequently solidified.

The present application concerns pattern formation in liquid materials and solidification of the patterned materials to form topographically patterned coatings. Relevant patterning technologies include: pattern coating and printing methods; replication methods including various molding, embossing, and lithographic processes; and self-organizing phenomena.

Pattern coating and printing technologies are used to selectively deposit liquid material on regions of a surface. Pattern coating methods include: gravure coating, which uses a roll with a pattern of cells to transfer and dispose the coating liquid; patterned die coating, which uses a die with patterned orifices to dispose liquid to certain areas of a surface; spray coating and the common paint brush, which deposit liquid on selected areas of a surface under the spray nozzle or brush. Patterned printing methods include: screen printing, which disposes liquid to a surface through a patterned screen; flexographic printing, which uses a patterned elastomeric surface or printing plate to transfer liquid to a surface; offset printing, where a liquid is transferred from a patterned surface to a smooth intermediate surface and then transferred again to the surface to be coated; and ink jet printing, where drops, mists, or jets of liquid are disposed to a surface. These methods have the common feature of disposing material to a surface in a non-uniform manner. The resultant non-uniform liquid coating may then be solidified to form a topographically patterned coating.

Replication methods can be divided into those where a liquid is disposed to a patterned master, solidified, and then removed from the master, and those where an initially smooth liquid surface is impressed with a patterned tool, solidified, and removed from the tool. The former are variations on molding. The latter are variations on embossing. A common feature of all these replication technologies is that the liquid comes into contact with a patterning tool.

Recently, several new lithographic technologies have been described. Electro-hydrodynamic lithography and thermo-mechanical lithography involve placing a charged or heated mask in close proximity to a liquid photoresist layer. Electro-hydrodynamic or thermo-capillary effects cause the liquid surface to deform and eventually contact protrusions on the mask surface, forming a positive image of the mask structure. The liquid is then solidified in place to form a pattern of areas for subsequent processing. These replication technologies are some of the few that do not rely on solid contact to deform the liquid surface, though in both processes solid surfaces ultimately come into contact with the liquid.

Finally, self-organizing behavior can create topographical patterns. Benard and Marangoni instabilities are common topographical pattern forming phenomena. Benard instabilities develop from gradients in density in a liquid layer. Marangoni instabilities develop from gradients in surface tension due to concentration or temperature gradients in a liquid layer. Both Benard and Marangoni instabilities give rise to patterns, typically cellular or roll-like, whose size and shape can be controlled only within their naturally occurring limits. Under certain conditions, these structures may be solidified into place, leaving topographical patterns corresponding to the liquid flow patterns. In many coatings, these patterns are considered defects. A major limitation of purposeful application of self-organized patterns is that the patterns are significantly constrained by the structure of the fluid instability.

SUMMARY

Generally, the present invention relates to methods of making patterned coatings. The present invention more particularly relates to methods of making patterned coatings by providing a pattern of energy to or removing a pattern of energy from a liquid coating and solidifying the resulting patterned coating.

In one embodiment, a method of forming a patterned coating is disclosed. The method includes the steps of disposing a composition onto a substrate to form a liquid coating on the substrate and removing energy through a first pattern of areas on the liquid coating to form a topographically patterned coating, the topographical pattern corresponding to the first pattern of areas.

In a further embodiment, a method of forming a patterned coating includes the steps of disposing a composition onto a substrate to form a liquid coating on the substrate and providing energy from an energy source through a first pattern of areas on the liquid coating to form a topographically patterned coating. The topographical pattern corresponds to the first pattern of areas, and the coating is disposed between the substrate and the energy source.

In another embodiment, a method of forming a patterned coating includes the steps of disposing a composition onto a substrate to form a liquid coating on the substrate, disposing the substrate on a substantially smooth energy transfer surface, and providing energy from an energy transfer surface through a first pattern of areas on the liquid coating to form a topographically patterned coating, the topographical pattern corresponding to the first pattern of areas.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF FIGURES

FIG. 9 is an optical micrograph of a patterned coating formed according to Example 5;

FIG. 10 is a top view schematic diagram of an energy transfer surface pattern according to Example 6.

DETAILED DESCRIPTION

Figure 1:
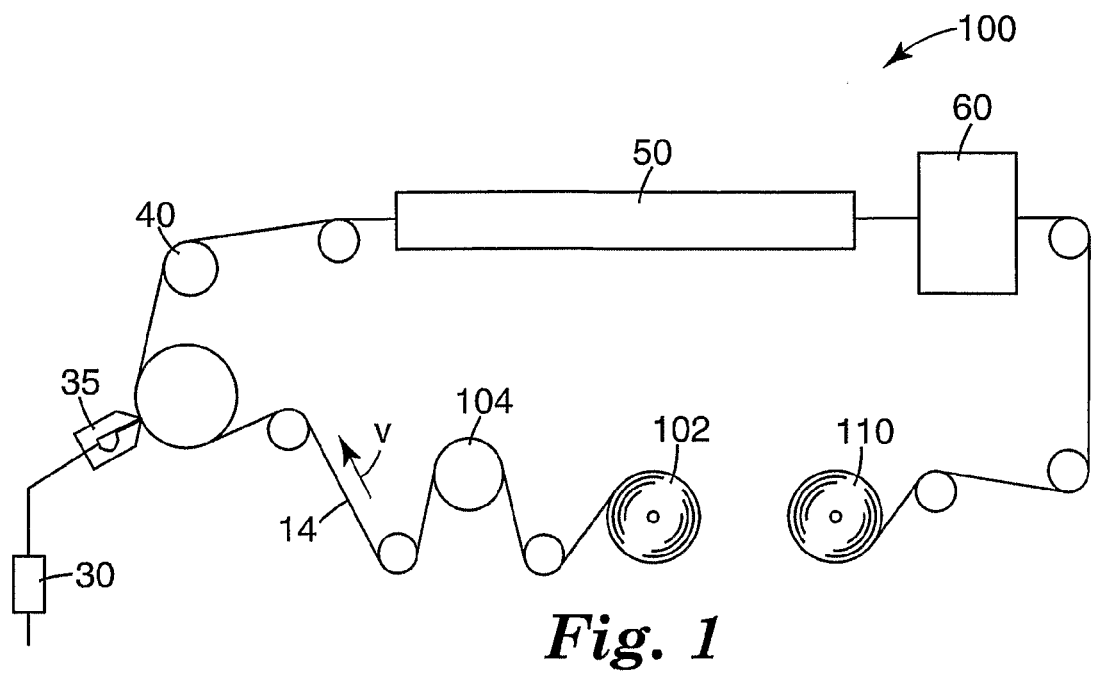
FIG. 1 is a schematic diagram of an exemplary continuous process for making a patterned coating.

The methods of making patterned coatings of the present invention are believed to be applicable to a variety of applications that utilize patterned coatings. In some embodiments, a topographical pattern of areas is formed on a coating by removing or providing energy through a corresponding pattern of areas on the coating. These examples, and the examples discussed below, provide an appreciation of the applicability of the disclosed, but should not be interpreted in a limiting sense.

The term "coating" refers to material disposed upon a material.

The term "area" may refer either to a two-dimensional surface, such as a material interface, or a region or portion of material. The appropriate definition is determined in context.

Unless otherwise indicated, the term "polymer" will be understood to include polymers, copolymers (e.g., polymers formed using two or more different monomers), oligomers and combinations thereof, as well as polymers, oligomers, or copolymers. Both block and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought by those skilled in the art utilizing the teachings disclosed herein.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" include plural referents unless the content clearly dictates otherwise. Thus, for example, reference to a composition containing "a polymer" includes two or more polymers. As used in this specification and the appended claims, the term "or" is generally employed in its sense including "and/or" unless the content clearly dictates otherwise.

The term "liquid" refers to a material that deforms continuously when subjected to a shear stress. It is recognized that liquids in the current context may contain particles or regions of solid materials as, for example, in a slurry, suspension, or dispersion.

The term "pattern" refers to a spatially varying structure. The term "pattern" includes a uniform or periodic pattern, a varying pattern, a random pattern, and the like.

The term "solids" refers to materials that are included in the solid coating, including components such as monomers that can be initially liquid.

This disclosure generally describes methods of making patterned coatings. The present application more particularly relates to methods of making patterned coatings by providing a pattern of energy to or removing a pattern of energy from a liquid coating and solidifying the resulting patterned coating. In many embodiments, the patterned coatings are formed without the coating physically contacting a replication tool. In some embodiments, the resulting coating pattern contains pattern elements that occur by natural instabilities.

In some embodiments, a method of forming a patterned coating includes the steps of disposing a composition onto a substrate to form a liquid coating on the substrate. The liquid coating composition can include any material useful in forming a film. The substrate can be any material useful for supporting film formation.

In some embodiments, the coating composition is a solution of film forming material or polymeric resin in a liquid vehicle. A partial listing of useful polymers includes; acetals, acrylics, acetates, cellulosics, fluorocarbons, amides, ethers, carbonates, esters, styrenes, urethanes, sulfones, gelatins, and the like. The polymers can be homopolymers or they can be copolymers formed from two or more monomers. Liquid vehicles for use in the coating composition can be chosen from a wide range of suitable materials. For example, the coating composition can be an aqueous composition or an organic solution comprising an organic solvent.

In some embodiments, the film forming material forms a pressure sensitive adhesive. In some embodiments, the pressure sensitive adhesive is a block copolymer pressure sensitive adhesive, a tackified elastomer pressure sensitive adhesive, a water-based latex pressure sensitive adhesive, an acrylate-based pressure sensitive adhesive, or a silicon-based pressure sensitive adhesive.

In some embodiments, the film forming material forms an optical film. Examples of optical films include compensation films, retardation films, brightness enhancing films, diffuser films, and the like. Optical film can be formed from any useful polymer such as, for example, olefins, acrylates, cellulosics, fluorocarbons, carbonates, and the like.

In some embodiments, organic solvents include ketones such as acetone or methyl ethyl ketone, hydrocarbons such as benzene or toluene, alcohols such as methanol or isopropanol, halogenated alkanes such as ethylene dichloride or propylene dichloride, esters such as ethyl acetate or butyl acetate, and the like. Combinations of two or more organic solvents can, of course, be utilized as the liquid vehicle or the liquid vehicle can be a mixed aqueous-organic system. In some embodiments, water is the liquid vehicle.

In some embodiments, the weight percentage of solids in the coating composition can be 0.1 to 100%, or 1 to 40% or 1 to 20%. In some embodiments, the coating composition is 100% monomer. The coating composition has a viscosity such that it is flowable. The viscosity for the coating composition will depend on the type of coating apparatus employed and can be up to 10,000 centipoise or more, or in the range from 0.1 to 1,000 centipoise, or from 0.1 to 100 centipoise, or from 0.5 to 10 centipoise, or from 1 to 5 centipoise.

In some embodiments, the liquid coating includes a solid phase material. The solid phase material can include discrete solid phase particles having a mean diameter in a range from 5 nanometers to 1 millimeter. In some embodiments, the solid phase material is nanoparticles. In one embodiment, the solid phase material is silica nanoparticles having a mean diameter in a range from 5 to 75 nanometers. In other embodiments, the solid phase material is zirconia, diamond, or solid discrete polymer beads such as, for example, polymethyl methacrylate (PMMA).

The substrate upon which the coating composition is disposed can be composed of any material whatever, as long as it is a material that allows suitable disposition of the liquid coating composition. In some embodiments, it is a sheet material that is coated as a continuous web in a continuous coating process. In other embodiments, it is in a discrete form such as separate sheets carried through the coating and drying zones by a conveyor belt or similar device. Useful substrates include, for example, polymeric films such as films of polyesters, polyolefins or cellulose esters; metal foils such as aluminum or lead foils, paper, polymer-coated paper such as polyethylene-coated paper; rubber, and laminates having various layers of polymers or of polymer and metal foil.

Any suitable type of coating apparatus can be used to dispose one or more coating compositions (onto each other or next to each other) onto the substrate. Thus, for example, the coating composition can be disposed by dip coating, forward and reverse roll coating, wire wound rod coating, and die type coating. Die coaters include knife coaters, slot coaters, slide coaters, slide curtain coaters, drop die curtain coaters, and extrusion coaters among others. In some embodiments, one or more coating compositions can be "strip" coated onto the substrate. Wet coverage of the coating composition is also a matter of choice and will depend upon many factors such as the type of coating apparatus employed, the characteristics of the coating composition, and the desired thickness of the coated layer after drying.

The disposed coating composition can have any useful wet thickness. In some embodiments, the liquid coating has a wet thickness in a range from 0.5 to 5000 micrometers, or from 1 to 1000 micrometers, or from 10 to 1000 micrometers, or from 50 to 100 micrometers, or 100 to 1000 micrometers. In other embodiments, liquid coating has a wet thickness in a range from 5 to 1000 nanometers, or from 50 to 250 nanometers. In many embodiments, the disposed coating composition has a nominally uniform wet thickness.

The coating can be topographically patterned by removing energy from or providing energy to the liquid coating. Energy can be provided or removed through a first pattern of areas on the liquid coating to form a topographically patterned coating that corresponds to the first pattern of areas. The topographically patterned coating can then be solidified by, for example, drying, freezing, polymerizing, cross-linking, or curing the topographically patterned coating. In some embodiments, the topographically patterned coating is subjected to other processing prior to solidification. In some embodiments, the topographically patterned coating is not solidified.

Energy can be provided through a pattern of areas on the liquid coating by a variety of means. In some embodiments, an energy source directs energy directly onto the liquid coating such that the liquid coating is disposed between the energy source and the substrate. In some embodiments, the substrate is disposed between the energy source and the liquid coating. In some embodiments, an energy transfer surface contacts the substrate and provides energy to the liquid coating through the substrate. In some embodiments, the energy transfer surface is substantially smooth and energy is provided through a pattern of areas on the liquid coating. In other embodiments, the energy transfer surface is not smooth and energy is provided through a pattern of areas on the liquid coating.

In some embodiments, the energy source is a photonic energy source. The photonic energy source can direct photonic energy directly through a first pattern of areas on the liquid coating. In some embodiments, the photonic energy source is an infrared energy source. In another embodiment, the photonic energy source is a laser energy source.

Energy can be removed through a pattern of areas on the liquid coating by a variety of means. In some embodiments, an energy transfer surface contacts the substrate and removes energy from the liquid coating through the substrate. In some embodiments, the energy transfer surface is substantially smooth and energy is removed through a pattern of areas on the liquid coating. In other embodiments, the energy transfer surface is not smooth and energy is removed through a pattern of areas on the liquid coating. In some embodiments, energy can be provided to and removed from the liquid coating simultaneously or sequentially. In one embodiment, energy is provided through one side of the liquid coating and energy is removed through an opposite side of the liquid coating simultaneously to form the topographically patterned coating.

Energy can be removed from or provided to the liquid coating in any amount effective to create the topographical features. In some embodiments, an amount of energy is purposefully provided to and/or removed from the liquid coating to create a temperature difference between the pattern of areas where energy is provided or removed and the remaining areas. This temperature difference can be any useful temperature difference, for example, from greater than 0.1 degree Celsius, or from 0.1 to 100 degrees Celsius, or 1 to 50 degrees Celsius, or 5 to 50 degrees Celsius.

Topographical features formed on the coating can be any useful size and specifically determined by the pattern of areas where energy is provided to or removed from the liquid coating. In some embodiments, the topographical feature has a mean height of 10 nanometers to 1 millimeter and a mean width of 10 nanometers and greater.

Prior to or during the formation of the topographical pattern of areas, the environment above and/or below the liquid coating and substrate may be controlled to establish an appropriate coating state for pattern formation. In some embodiments, such environmental control could include control of gas phase temperature, or gas phase composition, or gas phase velocity in order to add or remove or impede removal of components from the liquid coating, or in order to induce reactions in the coating, or in order to melt or modify the viscosity of the coating, or the like. In some embodiments, such environmental control includes providing a thermally controlled contact surface, such as a heated or chilled roll or plate, or providing a radiative energy source, such as an infrared source, or providing a reaction-inducing energy source, such as an ultraviolet source, or the like. Such methods for controlling the environment around a coated substrate are known to those skilled in the art.

Following or during the formation of the topographical pattern of areas, the liquid coating can be dried, as desired. Drying coated substrates, such as webs, can require heating the coated substrate to cause volatile components to evaporate from the coating. The evaporated material is then removed. In some embodiments, drying is accomplished via conventional drying techniques. One conventional drying technique is impingement drying. Impingement drying systems for coated substrates utilize one or two-sided impingement dryer technology to impinge air to one or both sides of a moving substrate. In such conventional impingement dryer systems, air supports and heats the coated substrate and can supply energy to both the coated and non-coated sides of the substrate. In a conventional gap drying system, such as taught in the Huelsman et al. U.S. Pat. No. 5,581,905 and the Huelsman et al. U.S. Pat. No. 5,694,701, which are herein incorporated by reference, a coated substrate, such as a web, moves through the gap drying system without contacting solid surfaces. In one gap drying system configuration, energy is supplied to the backside of the moving web to evaporate solvent and a chilled platen is disposed above the moving web to remove the solvent by condensation. The gap drying system provides for solvent recovery, reduced solvent emissions to the environment, and a controlled and relatively inexpensive drying system. In the gap drying system, the web is transported through the drying system supported by a fluid, such as air, which avoids scratches on the web. As is the case for impingement dryer systems, previous systems for conveying a moving web without contacting the web can employ air jet nozzles that impinge an air jet against the web. Most of the energy is transferred to the backside of the web by convection because of the high velocity of air flow from the air jet nozzles. Many impingement dryer systems can also transfer energy to the front side of the web.

Substrates that have been coated can be dried using a drying oven that contains a drying gas. The drying gas, usually air, is heated to a suitable elevated temperature and brought into contact with the coated substrate in order to bring about evaporation of the solvent. The drying gas can be introduced into the drying oven in a variety of ways. In some systems, the drying gas is directed in a manner that distributes it uniformly over the surface of the coated substrate under carefully controlled conditions that are designed to result in a minimum amount of disturbance of the coating. The spent drying gas, that is, drying gas that has become laden with solvent vapor evaporated from the coating, is continuously discharged from the dryer. Many industrial dryers use a number of individually isolated zones to allow for flexibility in drying characteristics along the drying path. For example, U.S. Pat. No. 5,060,396 describes a zoned cylindrical dryer for removing solvents from a traveling coated substrate. The multiple drying zones are physically separated, and each drying zone may operate at a different temperature and pressure. Multiple drying zones can be desirable because they permit the use of graded drying gas temperature and solvent vapor composition.

The topographically patterned coating can be further processed, as desired. In some embodiments, the topographically patterned coating includes curable components that can be cured via a thermal or light curing processing.

FIG. 1 is a schematic diagram (not to scale) of an exemplary continuous process 100 for making a patterned coating. This process 100 includes an unwind station 102, a velocity control roll 104, a drying station 50, a UV curing station 60, and a rewind station 110. Additional idler rolls can be used for web transport, as needed. The web or substrate 14 is transported through the process 100 at speed v. A coating die 35 disposes a coating composition to the substrate 14. A pump 30 can supply the coating die with the coating composition. The liquid coating can then be patterned with a temperature controlled patterned roll 40 in thermal communication with the uncoated side of the substrate 14. The patterned roll 40 can have a pyramidal knurl with a pitch of 63 lines per centimeter and a pitch angle, d, of 45 degrees (see FIG. 3.) The roll diameter can be 11.4 cm.

Figure 3:
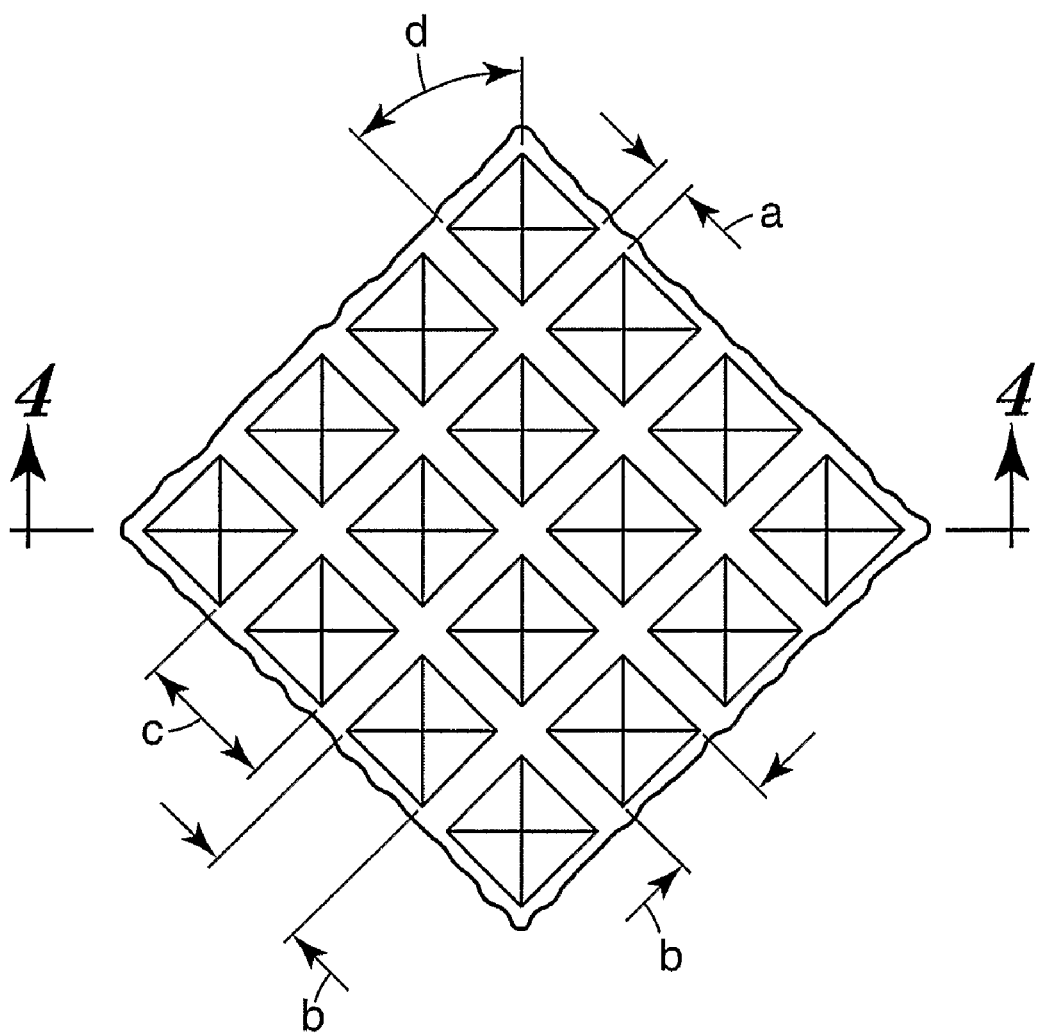
FIG. 3 is a top view schematic diagram of an energy transfer surface pattern.
Figure 4:
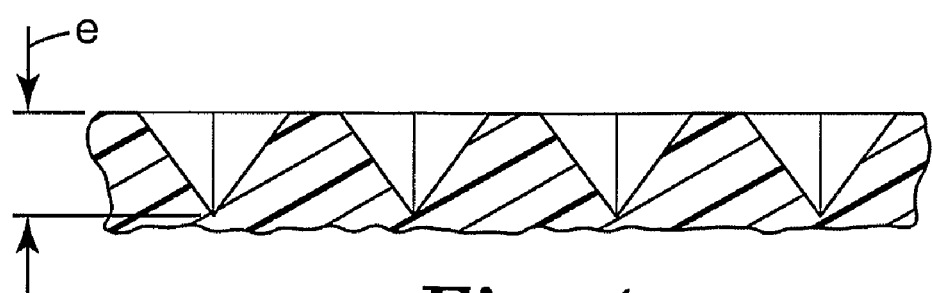
FIG. 4 is a cross-section schematic diagram of the energy transfer surface pattern shown in FIG. 3, taken along line 4-4.

A top view schematic diagram of an exemplary energy transfer surface pattern is shown in FIG. 3. The pattern dimensions can include a land width, a, of 63 micrometers and a cell side length, b, of 95 micrometers, resulting in a pattern period, c, of 158 micrometers. The internal angle (not labeled) of the cell is 70 degrees. FIG. 4 is a cross-section schematic diagram of the energy transfer surface pattern shown in FIG. 3, taken along line 4-4. The cell depth, e, is 69 micrometers.

Figure 2:
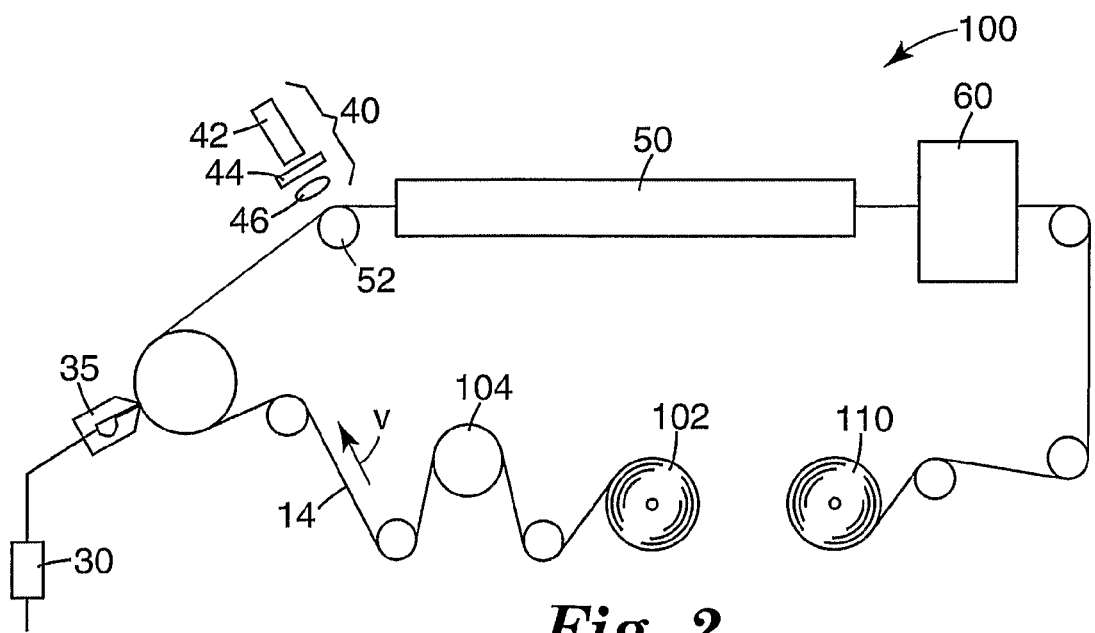
FIG. 2 is a schematic diagram of another exemplary continuous process for making a patterned coating.

FIG. 2 is a schematic diagram (not to scale) of another exemplary continuous process 100 for making a patterned coating. This process 100 includes an unwind station 102, a velocity control roll 104, a drying station 50, a UV curing station 60, and a rewind station 110. Additional idler rolls can be used for web transport, as needed. The web or substrate 14 is transported through the process 100 at speed v. A coating die 35 disposes a coating composition to the substrate 14. A pump 30 can supply the coating die with the coating composition. The liquid coating can then be patterned with a laser system 40. The laser system 40 can include a laser 42, a mechanical chopper 44 and a focusing lens 46. The uncoated side of the substrate 14 can be in contact with a support roll 52.

EXAMPLES

Materials
CAB 171-15s: cellulose-acetate-butyrate (Eastman Chemical Company, Kingsport, Tenn.) White wax beads: 20% R104 TiO2 and 80% Polywax 1000 (Baker Petrolite, Sugar Land, Tex.)
SR-1000: MQ resin (GE Silicones, Waterford, N.Y.)
SR-545: 60% solids solution of MQ resin in toluene (GE Silicones, Waterford, N.Y.)
DMS-T11: Silicone fluid (Gelest Inc., Tullytown, Pa.)
H-MDI: Methylenedicyclohexylene-4,4'-diisocyanate, DESMODUR W H12MDI (Bayer Chemicals, Pittsburgh, Pa.)
PDMS: polydiamine silicone prepared as in Example 2 of U.S. Pat. No. 5,512,650
Syloid 803: micro-sized silica gel, manufactured by Grace Davidson WR Grace & Co., Baltimore Md. 21203
Butvar B-79, polyvinyl butyral (Solutia Inc., St. Louis, Mo.)

Example 1

Figure 5:
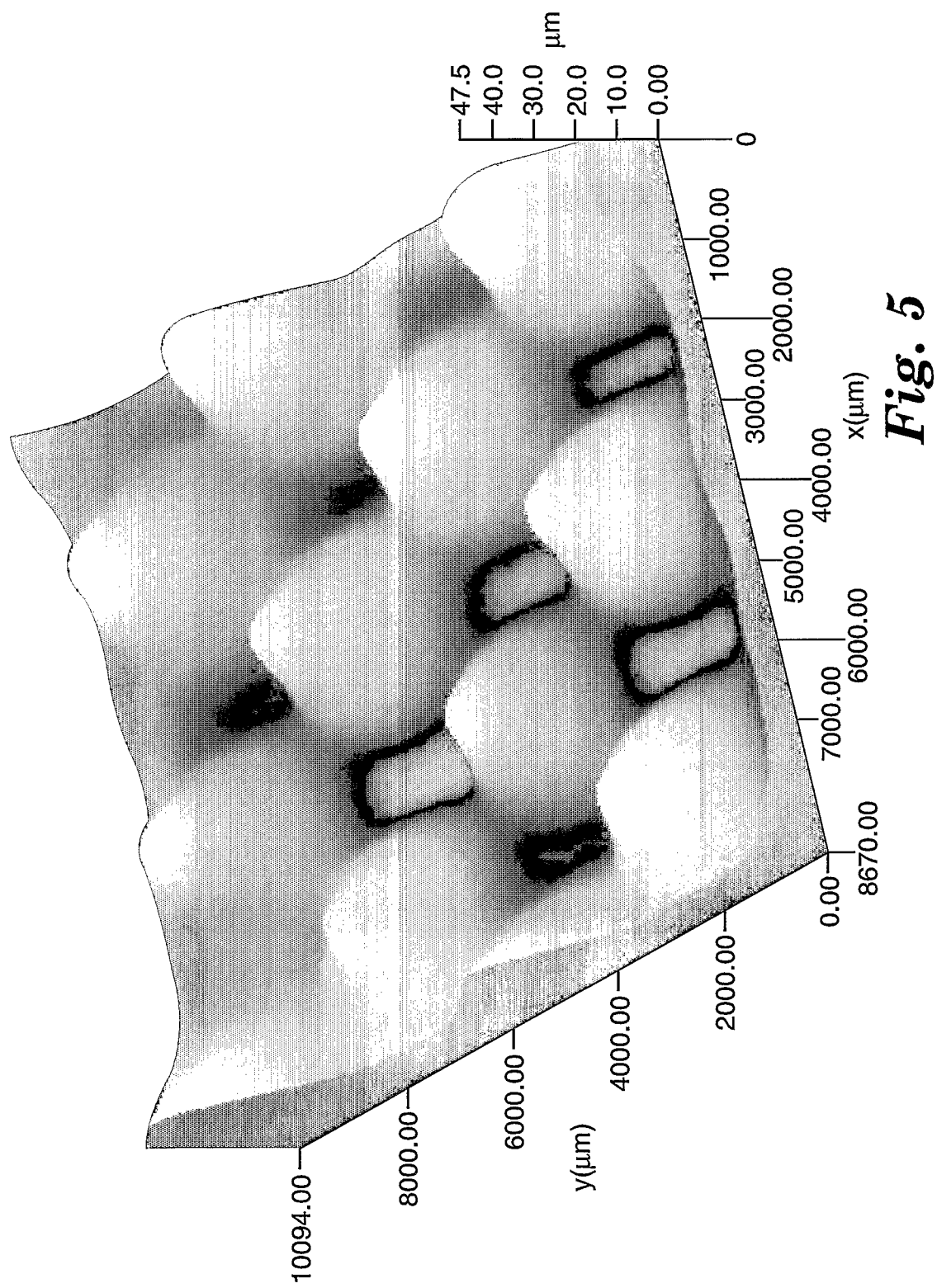
FIG. 5 is a perspective surface profile of a patterned coating formed according to Example 1.

A topographically patterned coating was prepared by disposing a solution consisting of 13% cellulose-acetate-butyrate (CAB 171-15s) in acetone onto a 48 micrometer thickness clear polyester film using a BWK Gardner Multiple Clearance Applicator with a gap setting of 254 micrometers. The dry coating weight was approximately 14 grams/meter$^2$. The coated film was then placed (coating facing upward) onto a 0.8 mm thick aluminum plate that had been drilled with an array of holes 1.6 mm in diameter and nearest neighbor center-to-center spacing of 3.2 mm. The aluminum plate was then placed on a temperature-controlled plate and chilled to 10° C. The coating on the film was then allowed to dry for approximately 15 minutes. The profile of the dried, patterned coating was then measured using a KLA Tencor P-10 Surface Profilometer and is shown in FIG. 5.

Example 2

Figure 6:
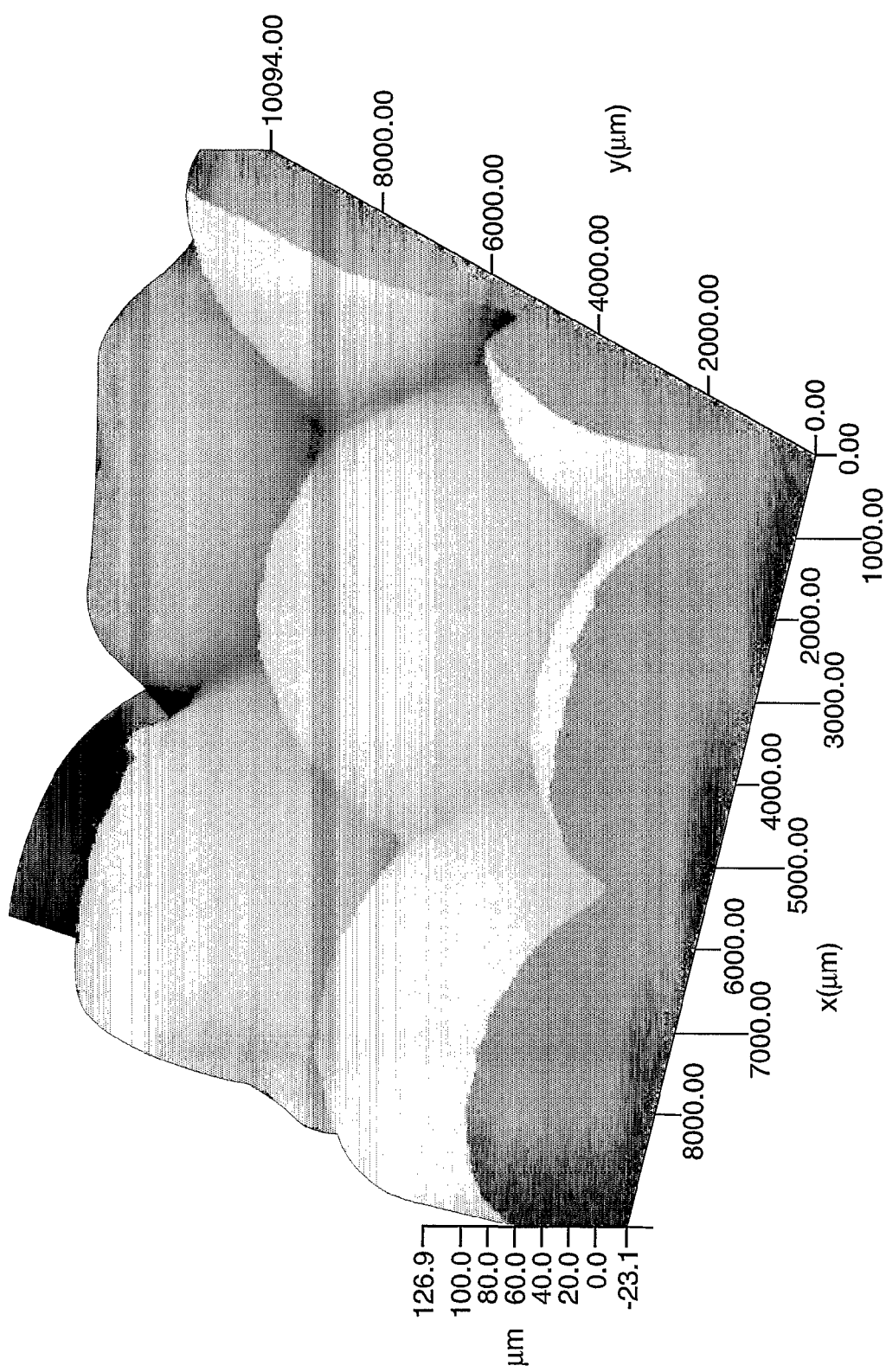
FIG. 6 is a perspective surface profile of a patterned coating formed according to Example 2.

A topographically patterned adhesive coating was prepared by disposing a water-based latex pressure sensitive adhesive (3M Wallsaver Adhesive) consisting of approximately 45% solids in water onto a 48 micrometer thickness clear polyester film using a BWK Gardner Multiple Clearance Applicator with a gap setting of 381 micrometers. The dry coating weight was approximately 98 grams/meter$^2$. The coated film was then placed (coating facing upward) onto a 9.5 mm thick silicone rubber sheet. A 1.1 mm thick aluminum plate that had been drilled with an array of holes 3.2 mm in diameter and nearest neighbor center-to-center spacing of 4.8 mm was positioned approximately 3 mm above the coated film using glass sides as spacers at the corners of the coated film. A Watlow RAYMAX Model 1525 infrared heater set at full power was positioned approximately 15 cm above the aluminum plate. The coating on the film was then allowed to dry for approximately 15 minutes. The coating and film were then removed from the plate and dried with a hot air gun until the entire coating appeared clear. The profile of the dried, patterned coating was then measured using a KLA Tencor P-10 Surface Profilometer and is shown in FIG. 6.

Example 3

A topographically patterned adhesive was prepared by disposing an adhesive (consisting of a 30% solids; 1:1 14K: SPU elastomer in 70:30 mixture of toluene and 2-propanol diluted to 10% solids with 50:50 mixture of toluene and 2-butanone) using a process illustrated in FIG. 1. The solution was supplied to coating die 35 at a rate of 7.5 cm$^3$/min by pump 30. The adhesive was disposed uniformly through a 10.2 cm wide coating die 35 to substrate 14 moving at a speed v of 2.54 cm/sec. Substrate 14 was PET 15.2 cm wide and 14.2 micrometers in thickness. The adhesive was patterned by transporting adhesive coated substrate 14 "over" temperature controlled patterned roll 40. The substrate 14 wraps patterning roll 40 approximately 80 degrees (portion of substrate in thermal communication with roll 40). Roll 40 temperature was measured to be approximately 80 degrees Celsius. The patterned adhesive coating was then transported through dryer 50 and wound up at rewind station 110.

Figure 7:
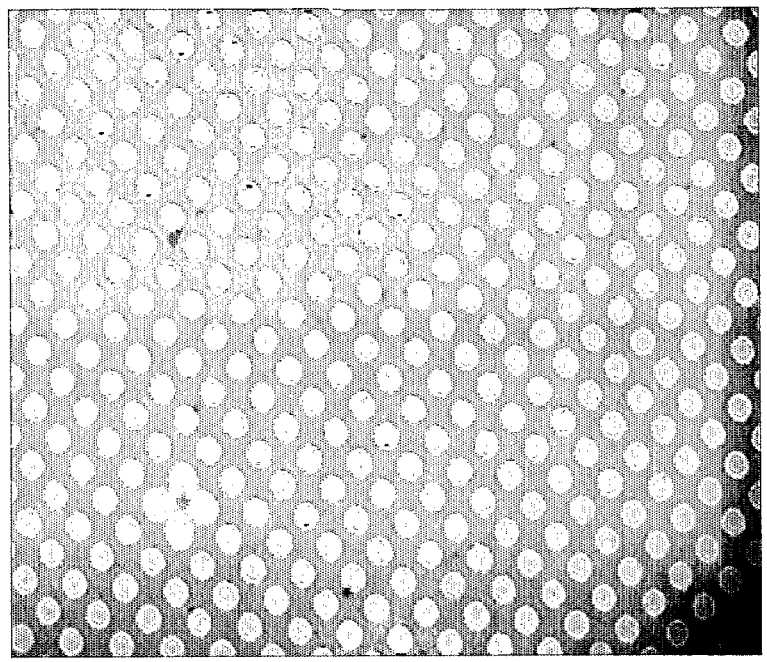
FIG. 7 is an optical micrograph of a patterned coating formed according to Example 3.

The patterned adhesive coating was then laminated to 178 micrometer thick PET film and imaged using an Olympus BX-51 microscope in bright field illumination with 5× objective as shown in FIG. 7. The lighter circular areas are air pockets within the laminate between structure adhesive coating and laminated PET film.

Example 4

A topographically patterned coating was prepared by disposing a UV curable acrylate hardcoat solution (formed as described in Example 3 of U.S. Pat. No. 6,299,799) consisting of 30% acrylates and photoinitiator, 36% toluene and 34% 2-propanol and using a process illustrated in FIG. 1. The solution was supplied to coating die 35 at a rate of 1.5 cm$^3$/min by pump 30. The solution was disposed uniformly through a 10.2 cm wide coating die 35 to substrate 14 moving at a speed v of 5.1 cm/sec. Substrate 14 was PET 15.2 cm wide and 14.2 micrometers in thickness. The solution was patterned by transporting coated substrate 14 "over" temperature controlled patterned roll 40. The substrate 14 wraps patterning roll 40 approximately 80 degrees (portion of substrate in thermal communication with roll 40). Roll 40 temperature was measured to be approximately 57 degrees Celsius. Patterned coating was then transported through dryer 50 and UV cure station 60 and wound up at rewind station 110.

Figure 8:
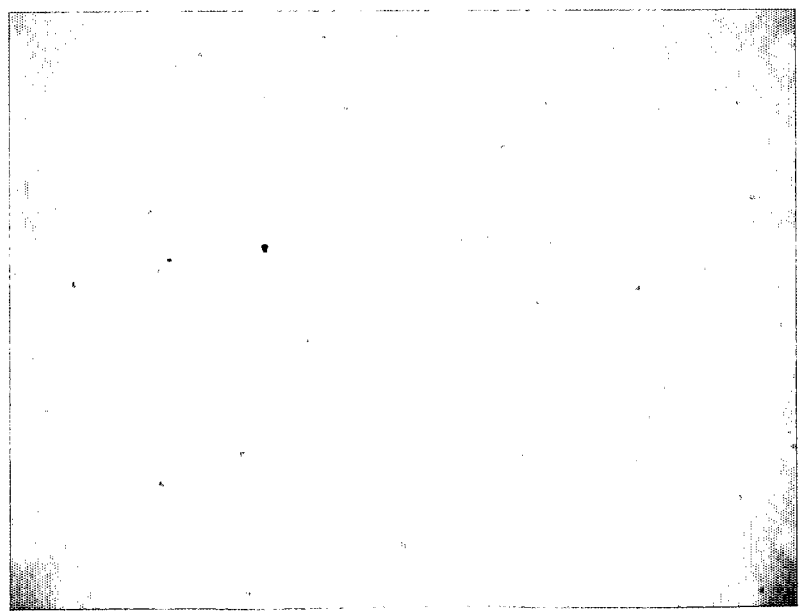
FIG. 8 is an optical micrograph of a patterned coating formed according to Example 4.

The patterned coating was imaged using an Olympus BX-51 microscope with Differential Interference Contrast (DIC) optics and 10× objective as shown in FIG. 8.

Example 5

A patterned coating was prepared by disposing a UV curable acrylate hardcoat solution (essentially formed as described in Example 3 of U.S. Pat. No. 6,299,799) containing 3 micrometer Syloid silica beads (29.8% acrylate, 36% toluene, 33.6% 2-propanol and 0.6% Syloid 803) and using a process illustrated in FIG. 2. The solution was supplied to coating die 35 at a rate of 4 cm$^3$/min by pump 30. The solution was disposed uniformly through a 10.2 cm wide coating die 35 to substrate 14 moving at a speed v of 5.1 cm/sec. Substrate 14 was transparent PET 15.2 cm wide and 50.8 micrometers in thickness. The solution was patterned by exposing the coated substrate 14 to a mechanically chopped and focused beam of infrared radiation as it was transported "over" smooth idler roll 52. Laser 42, (100 mW 780-1150 nm wavelength diode laser manufactured by Lasermax Inc., 3495 Winton Pl Bldg. 8, Rochester N.Y. 14623) was chopped with a mechanical chopping wheel, 44, and focused with focusing lens 46. Smooth idler roll 52, consisted of an aluminum shell with an outside diameter of 8.9 cm and a 200 micrometer thick layer of black colored insulating material (3M Scotch™ Super 33+ Vinyl Electrical Tape 30-0665) wrapping the outer surface. Patterned coating was then transported through dryer 50 and UV cure station 60 and wound up at rewind station 110.

The patterned bead containing coating was imaged using an Olympus BX-51 microscope with Differential Interference Contrast (DIC) optics and 5× objective as shown in FIG. 9.

Example 6

Figure 11:
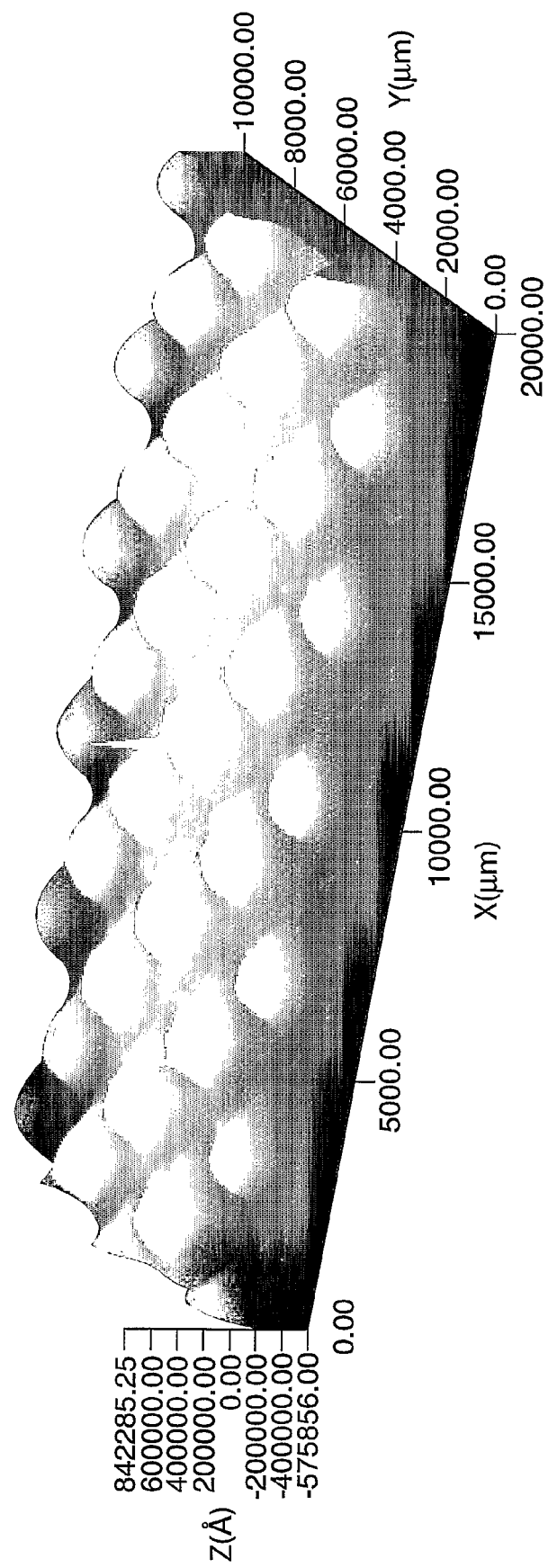
FIG. 11 is a perspective surface profile of a patterned coating formed according to Example 6.

A topographically patterned coating was prepared by coating a solution consisting of 12% by weight polyvinyl butyral (Butvar-B79) in a solvent blend (42% by weight methyl ethyl ketone and 58% by weight methanol) onto a polymer test sheet. The sheet consisted of a clear polymer film coated with a photographic emulsion and exposed to create a test pattern of black squares, as shown in FIG. 10. The test sheet thickness was 107 micrometers. The coating was cast onto the imaged side of the test sheet using a BWK Gardner Multiple Clearance Applicator with a gap setting of 381 micrometers. The coated film was then placed (coating facing upward) onto a frame 27 cm above a 250 watt SLI Lighting heat lamp. A glass cover sheet was then positioned 6.5 mm above the test sheet. The coating on the film was then allowed to dry for approximately 10 minutes. The profile of the dried, patterned coating was then measured using a KLA Tencor P-10 Surface Profilometer and is shown in FIG. 11.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A method of forming a topographically patterned coating comprising the steps of:
   a) disposing a composition comprising a polymer or polymer precursors onto a substrate selected from the group polymeric films, paper, polymer-coated paper, rubber and laminates of polymers, to form a liquid coating on the substrate;

b) cooling the coating through the substrate by means of an energy transfer surface selected from a plate on the side of the substrate opposite the liquid coating and a roll over which the coated substrate is transported, the plate or roll having a first pattern of areas to form a topographically patterned coating, the topographical pattern corresponding to the first pattern of areas; and c) solidifying the topographically patterned coating by polymerizing, cross-linking, curing, drying, or freezing the coating to yield topographical features having a mean height of 10 nanometers to 1 millimeter and a mean width of 10 nanometers or greater.

2. A method according to claim 1 further comprising providing energy through one side of the liquid coating from a source external to the coating simultaneously with removing energy through an opposite side.

3. A method according to claim 1 wherein the disposing step comprises disposing a composition comprising a polymer or polymer precursor and a liquid vehicle onto a substrate to form a liquid coating on the substrate.

4. A method according to claim 3 further comprising removing the liquid vehicle component from the coating.

5. A method according to claim 1 wherein the solidifying step comprises polymerizing, cross-linking, or curing the topographically patterned coating by exposing it to ultraviolet radiation.

6. A method of forming a topographically patterned coating comprising the steps of:

a) disposing a composition comprising a polymer or polymer precursor onto a substrate selected from the group polymeric films, paper, polymer-coated paper, rubber and laminates of polymers, to form a liquid coating on the substrate;

b) providing energy to the liquid coating from an energy source selected from an infrared source directing infrared energy through a first pattern of areas on a polymer film or metal plate or a laser beam chopped to create a first pattern of areas to form a topographically patterned coating, the topographical pattern corresponding to the first pattern of areas, the coating being disposed between the substrate and the energy source; and c) solidifying the topographically patterned coating by polymerizing, cross-linking, curing, drying or freezing the coating to yield topographical features having a mean height of 10 nanometers to 1 millimeter and a mean width of 10 nanometers or greater.

7. A method according to claim 6 further in which the step of solidifying the topographically patterned coating comprises exposing it to ultraviolet radiation.

8. A method according to claim 6 wherein the disposing step comprises disposing a composition comprising a polymer or polymer precursor and a liquid vehicle onto a substrate to form a liquid coating on the substrate.

9. A method according to claim 8 further comprising removing the liquid vehicle component from the coating.

10. A method of forming a topographically patterned coating comprising the steps of:

a) disposing a composition onto a substrate selected from the group polymeric films, paper, polymer-coated paper, rubber and laminates of polymers to form a liquid coating on the substrate;

b) disposing the substrate on an energy transfer surface on a plate or a roll over which the substrate is transported;

providing energy selected from the group consisting of infrared and heat energy from the energy transfer surface through a first pattern of areas on the energy transfer surface to form a topographically patterned coating; and c) solidifying the topographically patterned coating by polymerizing, cross-linking, curing, drying or freezing the coating, the topographical pattern corresponding to the first pattern of areas, the topographical features of the pattern having a mean height of 10 nanometers to 1 millimeter and a mean width of 10 nanometers or greater.

11. A method of forming a topographically patterned coating comprising the steps of:

a) disposing a pressure sensitive adhesive forming composition onto a substrate selected from the group polymeric films, paper, polymer-coated paper, rubber and laminates of polymers, to form a liquid coating on the substrate;

b) providing energy to the coating from an energy source selected from infrared energy directed through a first pattern of areas on a polymer film or metal plate or a laser beam chopped to create a first pattern of areas to form a topographically patterned coating, the topographical pattern corresponding to the first pattern of areas; and c) solidifying the topographically patterned coating by polymerizing, cross-linking, curing, drying or freezing the coating, to yield topographical features having a mean height of 10 nanometers to 1 millimeter and a mean width of 10 nanometers or greater.

12. A method of forming a topographically patterned coating comprising the steps of:

a) disposing a composition comprising a polymer or polymer precursor and nanoparticles onto a substrate selected from the group polymeric films, paper, polymer-coated paper, rubber and laminates of polymers, to form a liquid coating on the substrate;

b) providing energy to the coating from an energy source selected from infrared energy directed through a first pattern of areas on a polymer film or metal plate or a laser beam chopped to create a first pattern of areas to form a topographically patterned coating, the topographical pattern corresponding to the first pattern of areas; and c) solidifying the topographically patterned coating by polymerizing, cross-linking, curing, drying or freezing the coating, to yield topographical features having a mean height of 10 nanometers to 1 millimeter and a mean width of 10 nanometers or greater.

* * * * *